United States Patent
Deshpande

(10) Patent No.: US 10,843,693 B2
(45) Date of Patent: Nov. 24, 2020

(54) SYSTEM AND METHOD FOR REAR COLLISION AVOIDANCE

(71) Applicant: Robert Bosch GmbH, Stuttgart (DE)

(72) Inventor: Anup Deshpande, Troy, MI (US)

(73) Assignee: Robert Bosch GmbH, Stuttgart (DE)

(*) Notice: Subject to any disclaimer, the term of this patent is extended or adjusted under 35 U.S.C. 154(b) by 114 days.

(21) Appl. No.: 16/164,443

(22) Filed: Oct. 18, 2018

(65) Prior Publication Data

US 2020/0122773 A1 Apr. 23, 2020

(51) Int. Cl.
| | | |
|---|---|---|
| *B60W 30/095* | (2012.01) | |
| *B60T 7/12* | (2006.01) | |
| *B62D 15/02* | (2006.01) | |
| *B60W 30/09* | (2012.01) | |
| *B60W 60/00* | (2020.01) | |
| *B60W 30/08* | (2012.01) | |
| *B60R 21/013* | (2006.01) | |

(Continued)

(52) U.S. Cl.
CPC ....... *B60W 30/0956* (2013.01); *B60R 21/013* (2013.01); *B60T 7/12* (2013.01); *B60W 30/08* (2013.01); *B60W 30/09* (2013.01); *B60W 30/095* (2013.01); *B60W 60/0016* (2020.02); *B62D 15/0265* (2013.01); *G05D 1/0214* (2013.01); *B60R 2021/0011* (2013.01); *B60R 2300/804* (2013.01); *B60R 2300/8066* (2013.01); *B60T 2201/022* (2013.01); *G01S 2013/9318* (2020.01); *G01S 2013/9319* (2020.01); *G01S 2013/93272* (2020.01)

(58) Field of Classification Search
CPC ........... B60W 30/0956; B60W 30/095; B60W 60/0016; B60W 30/08; B60W 30/09; G05D 1/0214; B60R 21/013; B60R 2021/0011; B60R 2300/804; B60R 2300/8066; B60T 7/12; B60T 2201/022; B62D 15/0265; G01S 2013/9319; G01S 2013/93272
See application file for complete search history.

(56) References Cited

U.S. PATENT DOCUMENTS

| | | | |
|---|---|---|---|
| 7,057,501 B1 | 6/2006 | Davis | |
| 8,731,815 B2 * | 5/2014 | Cummings | ....... B60W 30/0956 701/301 |

(Continued)

FOREIGN PATENT DOCUMENTS

DE  10 2004 062 497  7/2006

*Primary Examiner* — Dale W Hilgendorf
(74) *Attorney, Agent, or Firm* — Kathy Takeguchi; Maginot, Moore & Beck LLP

(57) ABSTRACT

A collision avoidance system includes a sensor system and a control system. The control system includes at least one processing device. The control system is operable to receive sensor data from the sensor system. The control system is operable to generate acceleration data to prepare for an acceleration action of the subject vehicle. The control system is operable to generate steering data to prepare for a steering action of the subject vehicle. The control system is operable to perform operations to provide driving assistance to the subject vehicle if a driving control input is received after the control unit generates the acceleration data and the steering data. The control system is operable to control the subject vehicle in an autonomous driving mode if driving control input is not received after the control unit generates the acceleration data and the steering data.

17 Claims, 7 Drawing Sheets

(51) Int. Cl.
  *G05D 1/02* (2020.01)
  *G01S 13/931* (2020.01)
  *B60R 21/00* (2006.01)

(56) References Cited

U.S. PATENT DOCUMENTS

| | | | |
|---|---|---|---|
| 9,176,500 B1* | 11/2015 | Teller et al. | B60W 30/08 |
| 9,505,405 B2* | 11/2016 | Stanek et al. | B60W 30/09 |
| 9,586,584 B2 | 3/2017 | Parikh et al. | |
| 9,701,307 B1* | 7/2017 | Newman et al. | B60W 30/09 |
| 10,259,455 B2* | 4/2019 | Regmi | B60W 30/09 |
| 2007/0296564 A1 | 12/2007 | Howell et al. | |
| 2013/0057397 A1 | 3/2013 | Cutler et al. | |
| 2013/0088343 A1 | 4/2013 | Deigmöller et al. | |
| 2013/0141576 A1 | 6/2013 | Lord et al. | |
| 2013/0311075 A1 | 11/2013 | Tran et al. | |
| 2014/0309884 A1 | 10/2014 | Wolf | |
| 2016/0229397 A1* | 8/2016 | Muthukumar | B60W 30/09 |
| 2017/0259815 A1* | 9/2017 | Shaker | B60W 30/09 |
| 2018/0025645 A1 | 1/2018 | Schwindt et al. | |
| 2018/0222424 A1* | 8/2018 | Kodama et al. | B60W 30/095 |

* cited by examiner

SYSTEM AND METHOD FOR REAR COLLISION AVOIDANCE

FIELD OF THE INVENTION

This disclosure relates generally to collision avoidance.

BACKGROUND

Rear collisions are one of the most common types of vehicle accidents. In terms of preventing and avoiding accidents, most vehicles are driven with a focus on other vehicles that are in front of them with respect to their direction of travel. As such, these vehicles tend to be driven without awareness of other threats in their driving environment that are not in the area of their focus. For example, these vehicles may be driven without awareness of other vehicles, which are behind them with respect to their travel direction and which may be potential threats for rear collisions.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a method includes receiving sensor data from a plurality of sensors associated with a subject vehicle. The sensor data indicates at least (a) a speed of the subject vehicle, (b) a speed of another vehicle that is behind the subject vehicle in a direction of travel of the subject vehicle, and (c) a distance between the another vehicle and the subject vehicle. The method includes evaluating the sensor data to determine a risk level of a potential collision between the subject vehicle and the another vehicle. The method includes generating acceleration data to prepare the subject vehicle for an acceleration action based on the evaluation of the sensor data. The method includes generating steering data to prepare the subject vehicle for a steering action based on the evaluation of the sensor data. The method includes performing driving assistance if driving control input is received after the control unit generates the acceleration data and the steering data. The method includes controlling the subject vehicle in autonomous driving mode based on the evaluation of the sensor data if driving control input is not received after the control unit generates the acceleration data and the steering data.

In an example embodiment, a method includes receiving sensor data from a sensor system with one or more sensors associated with a subject vehicle. The method includes setting a threat level of the subject vehicle to be at a first level based on a first evaluation of the sensor data with respect to first threshold criteria. The method includes generating acceleration data to prepare for an acceleration action of the subject vehicle after the threat level is set at the first level. The method includes generating steering data to prepare for a steering action of the subject vehicle after the threat level is set at the first level. The method includes setting the threat level of the subject vehicle to be at a second level based on a second evaluation of an update of the sensor data with respect to second threshold criteria. The second level indicates a greater likelihood of a potential collision between the subject vehicle and another vehicle compared to the first level. The second threshold criteria includes a sufficient acceleration amount for the subject vehicle to avoid the potential collision and a sufficient deceleration amount for the another vehicle to avoid the potential collision. The control unit is configured to selectively provide the subject vehicle with either driving assistance or autonomous driving control after the threat level is set at the second level.

In an example embodiment, a collision avoidance system includes a sensor system and a control system. The sensor system includes at least one sensor associated with a subject vehicle. The control system includes at least one processing device. The control system is operable to receive sensor data from the sensor system. The control system is operable to generate acceleration data to prepare for an acceleration action of the subject vehicle. The control system is operable to generate steering data to prepare for a steering action of the subject vehicle. The control system is operable to perform operations to provide driving assistance to the subject vehicle if a driving control input is received after the control unit generates the acceleration data and the steering data. The control system is operable to control the subject vehicle in an autonomous driving mode if driving control input is not received after the control unit generates the acceleration data and the steering data.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
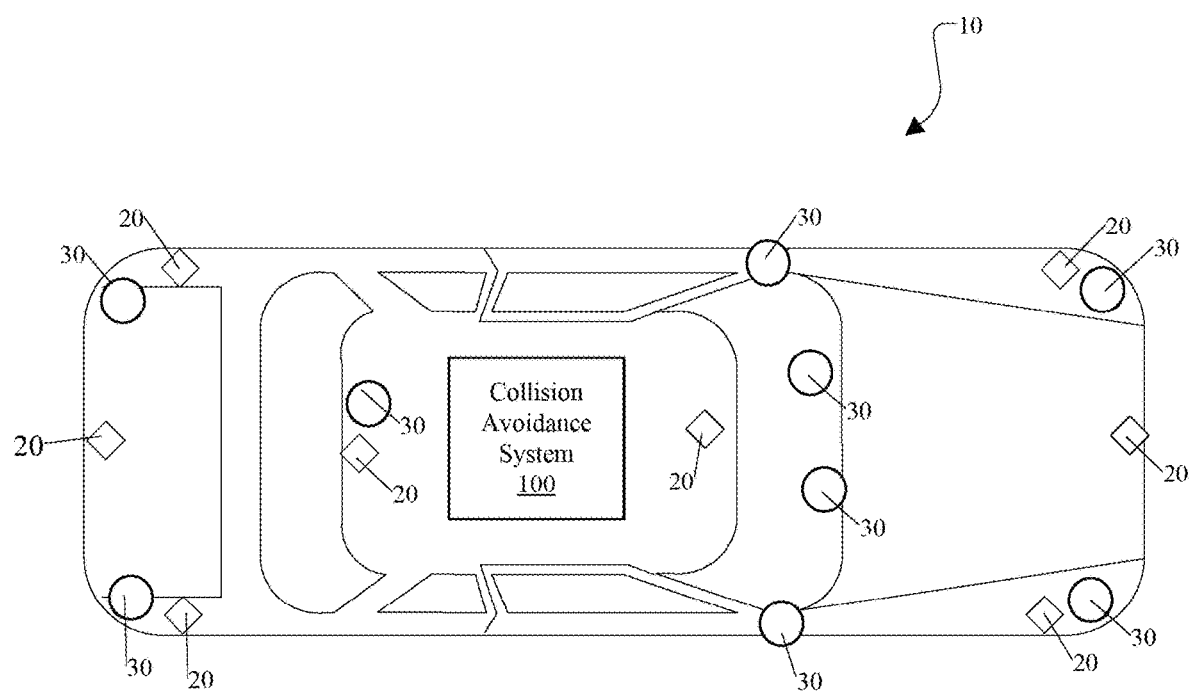
FIG. 1 is a diagram of vehicle with a system for rear collision avoidance according to an example embodiment of this disclosure.

FIG. 1 is a diagram of a vehicle 10 with a system 100 for rear collision avoidance according to an example embodiment. In an example embodiment, the vehicle 10 is a mobile machine, which is configured to be driven autonomously, semi-autonomously, non-autonomously, or any combination thereof. In an example embodiment, the system 100 includes hardware technology, software technology, or any combination of hardware and software technology. In an example embodiment, the system 100 is advantageous in enabling the vehicle 10 to avoid a potential collision by selectively providing driving assistance or autonomous driving control in accordance with an assessment of the situation. Moreover, the system 100 is configured to detect a threat level of a potential collision and provide immediate action to avoid or mitigate the potential collision. Also, when the driver's focus is ahead of the vehicle 10 in the direction of travel of the vehicle 10, the system 100 is advantageous in detecting, monitoring, and acting upon a threat that is at another side (e.g., rear side) of the vehicle 10 to avoid a collision.

In an example embodiment, the system 100 includes at least one or more sensors 20 at any suitable location of the vehicle 10 such that the sensor system 170 is enabled to provide proper sensor data to the control system 110. In this regard, for example, FIG. 1 merely illustrates a conceptual diagram that shows various sensors 20, which are placed at various locations to be able to sense an environment of the vehicle 10. In an example embodiment, the one or more sensors 20 are configured to capture data relating to the vehicle 10, the environment of the vehicle 10, other relevant information, or any combination thereof.

In an example embodiment, upon capturing the data, the one or more sensors 20 are configured to provide the captured data to the appropriate sensor system for processing. For instance, in FIG. 1, the vehicle 10 includes a plurality of sensors 20, which are configured to be processed by the appropriate sensor system. In this regard, for example, the vehicle 10 includes a camera system, a light detection and ranging (LIDAR) system, an image-based system, an odometer system, a radar system, a satellite navigation system (e.g., global positioning system (GPS), Galileo, or another satellite system), a sonar system, a simultaneous localization and mapping (SLAM) system, a visual-SLAM (vSLAM), an inertial measurement unit (IMU), an ultrasonic sensor system, any suitable sensor system, or any combination thereof.

In an example embodiment, the system 100 includes at least one or more indicators 30 at any suitable location of the vehicle 10 such that the indicator system 180 is enabled to provide notifications and/or alerts to any occupant of the vehicle 10, as well as to any entity (e.g., individual, another vehicle 300, etc.) that is in a vicinity of the vehicle 10 and/or in communication with the vehicle 10. In this regard, for example, FIG. 1 merely illustrates a conceptual diagram that shows various indicators 30, which are placed at various locations to be able to provide alerts regarding threats and/or actions of the vehicle 10. In an example embodiment, the one or more indicators 30 are configured to provide alerts, notifications, other relevant information, or any combination thereof as triggered or requested by the system 100. In this regard, for example, the indicator system 180 includes at least one display, signal light, tail lamp, sound system, horn, chime, any suitable I/O device, or any combination thereof.

Figure 2:
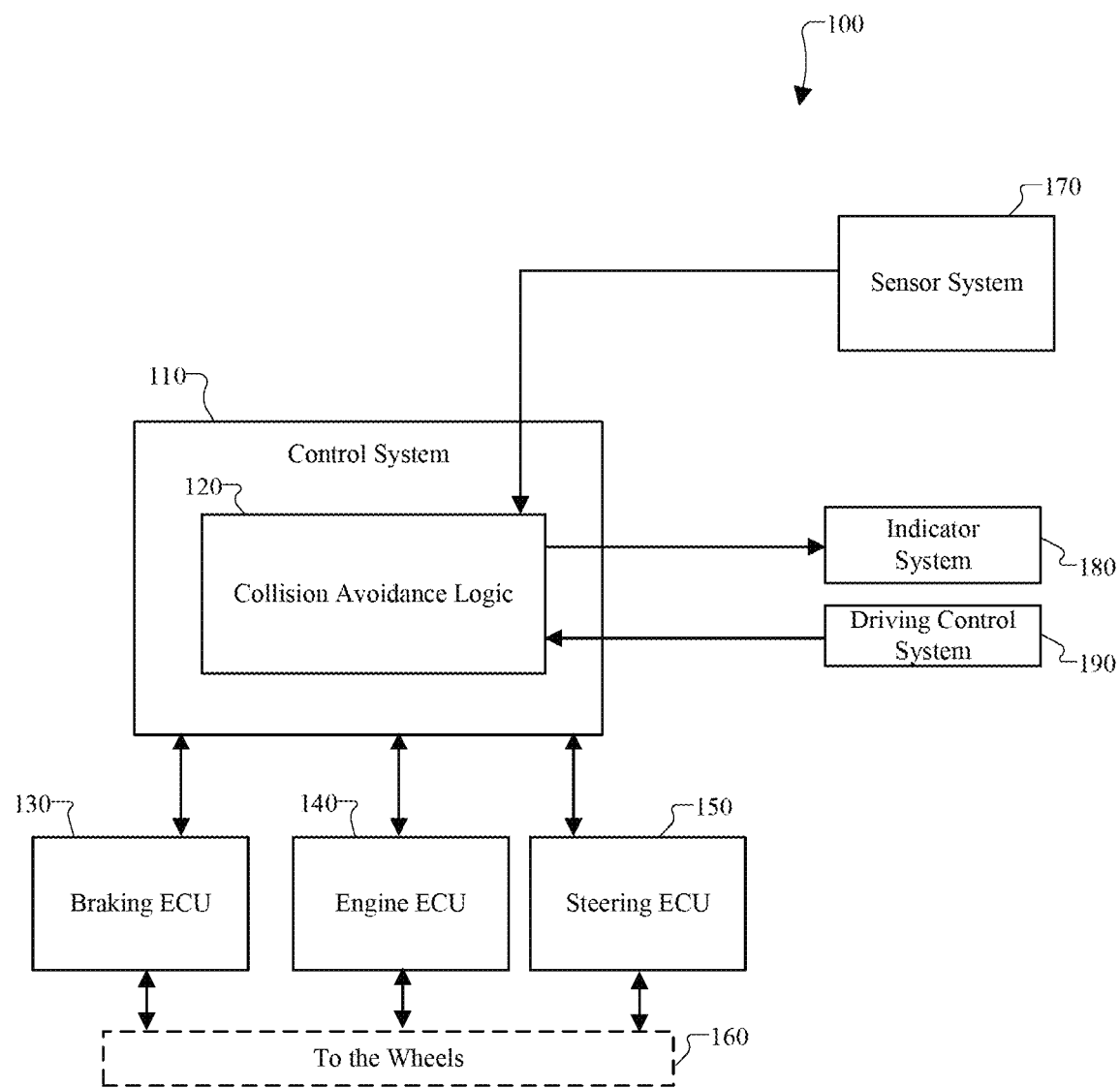
FIG. 2 is a block diagram of the system for rear collision avoidance according to an example embodiment of this disclosure.

FIG. 2 is a block diagram of a system 100 for rear collision avoidance according to an example embodiment. In an example embodiment, the system 100 includes at least a control system 110, collision avoidance logic 120, braking electronic control unit (ECU) 130, engine ECU 140, steering ECU 150, sensor system 170, indicator system 180, and driving control system 190. Additionally or alternatively, the system 100 can include one or more other components, which are not specifically mentioned herein, provided that the system 100 is configured to provide the functions described herein. In an example embodiment, the system 100 includes communication and/or network technology, which enables at least each of the components to communicate with each other, as shown in FIG. 2. In an example embodiment, for instance, the vehicle 10 and/or the system 100 includes control area network (CAN) technology, wired communication technology, wireless communication technology, any suitable networking technology, or any combination thereof to enable the components to communicate with each other. Also, in an example embodiment, the vehicle 10 and/or system 100 includes communication technology, which enables the vehicle 10 and/or system 100 to communicate with at least one other communication system (e.g., vehicle-to-infrastructure communication, vehicle-to-vehicle communication, etc.) to provide one or more functions described herein (e.g., checking for drivable space with safe conditions). In an example embodiment, the system 100 and its components are local to the vehicle 10. However, in an alternative embodiment, the system 100 can include one or more components, which are remote to the vehicle 10 but are also communicatively connected one or more components that are local to the vehicle 10.

In an example embodiment, the control system 110 is communicatively connected to one or more control components of the vehicle 10 to control at least one or more actions (e.g., steering, acceleration, braking, alerts, etc.) of the vehicle 10. In this regard, for instance, the control components include any suitable electrical, electronic, or computing modules, devices, and/or technology. For example, in FIG. 2, the control components are ECUs. More specifically, in FIG. 2, the control system 110 is connected to at least the braking ECU 130, the engine ECU 140, and the steering ECU 150. Also, as shown in FIG. 2, the braking ECU 130, the engine ECU 140, and the steering ECU 150 are communicatively coupled to and/or electrically connected to one or more wheels 160 of the vehicle 10. In an example embodiment, the braking ECU 130 is configured to control one or more brakes of the vehicle 10 and/or provide other relevant functions. In an example embodiment, the engine ECU 140 is configured to control the engine of the vehicle 10 and/or provide other relevant functions. In an example embodiment, the steering ECU 150 is configured to control the steering of the vehicle 10 and/or provide other relevant functions.

In an example embodiment, the control system 110 is configured to enable the vehicle 10 to take immediate action via the driver, driving assistance, or autonomous driving control after detecting a threat of a potential collision based on various factors. In an example embodiment, the control system 110 includes any suitable processing, or computing device, which is configured to provide at least the functionality described herein. In an example embodiment, the control system 110 is configured to receive sensor data from the sensor system 170 and driving controls (or driving control input via the driver) from the driving control system 190. In an example embodiment, responsive to the sensor data and driving controls, the control system 110 is configured to activate an indicator as an alert or notification, generate steering requests and/or steering data, generate acceleration requests and/or acceleration data, generate differential braking requests and/or braking data, generate safety requests and/or safety data (e.g., seat belt tensioning request/data), perform operations for driving assistance, perform operations for autonomous driving control, perform other appropriate actions, or any combination thereof. For example, in FIG. 2, the control system 110 is an ECU, which includes or is connected to collision avoidance logic 120 to provide the functionalities described herein. In an example embodiment, the collision avoidance logic 120 includes hardware, software, or a combination thereof. In an example embodiment, the collision avoidance logic 120 is a part of the control system 110. For instance, in an example embodiment, the collision avoidance logic 120 includes digital and/or software logic, which is integrated into the control system 110.

In an example embodiment, the sensor system 170 is communicatively connected to the control system 110, the collision avoidance logic 120, or a combination thereof. In an example embodiment, the sensor system 170 is configured to provide sensor data to the control system 110, the collision avoidance logic 120, or a combination thereof. In an example embodiment, upon detection, request, or any combination thereof, the sensor system 170 is configured to provide sensor data relating to the performance and/or operation of the vehicle 10 itself, the environment of the vehicle 10, the current driving conditions, the navigation of the vehicle 10, potential collision threats to the vehicle 10, other relevant information, or any combination, thereof. In this regard, the sensor system 170 includes one or more sensors 20. Also, in an example embodiment, the sensor system 170 includes any corresponding sensor system, which may be associated with one or more sensors 20. For instance, in an example embodiment, the sensor system 170 includes a camera system, a light detection and ranging (LIDAR) system, an image-based system, an odometer system, a radar system, a satellite navigation system (e.g., global positioning system (GPS), Galileo, or another satellite system), a sonar system, a simultaneous localization and mapping (SLAM) system, a visual-SLAM (vSLAM), an inertial measurement unit (IMU), an ultrasonic sensor system, a distance sensor, any suitable sensor system, or any combination thereof. For example, in FIGS. 1-2, the sensor system 170 is configured to provide sensor data that relates to or is indicative of at least a speed of the vehicle 10, an acceleration/deceleration of the vehicle 10, a location of the vehicle 10, a speed of another entity (e.g., vehicle 300) when in a vicinity of the vehicle 10, an acceleration/deceleration of another entity (e.g., vehicle 300) when in a vicinity of the vehicle 10, a location of another entity (e.g., vehicle 300) when in a vicinity of the vehicle 10, any obstacle within a vicinity of the vehicle 10, any clear drivable space within a vicinity of the vehicle 10, any relevant data, or any combination thereof such that the control system 110 and collision avoidance logic 120 are configured to provide the functions as described herein.

In an example embodiment, the indicator system 180 is communicatively connected to the control system 110, the collision avoidance logic 120, or a combination thereof. In an example embodiment, the indicator system 180 is configured to provide a notification and/or alert regarding a potential collision, as determined by the control system 110. In this regard, the indicator system 180 includes one or more indicators 30 that provide visual notifications, audio notifications, haptic notifications, any suitable notifications, or any combination thereof. Also, in an example embodiment, the indicator system 180 includes any necessary and corresponding indicator system for each indicator 30. For instance, in an example embodiment, the indicator system 180 includes at least one human-machine interface (HMI), chime, horn, sound system, tail lamp, signal light, display system, any suitable I/O device, or any combination thereof.

In an example embodiment, the driving control system 190 is communicatively connected to the control system 110, the collision avoidance logic 120, or a combination thereof. In an example embodiment, the driving control system 190 is configured to provide various driving controls and/or driving inputs to at least the control system 110 and/or the collision avoidance logic 120. In this regard, for example, the driving control system 190 is configured to provide driving control data relating to or indicative of a driver's action to control the vehicle 10. Additionally or alternatively, in this regard, the driving control system 190 includes one or more sensors that sense inputs from a driver of the vehicle 10. For instance, the driving control system 190 is configured to communicate to at least the control system 110 and/or the collision avoidance logic 120 regarding control of the vehicle 10 by a driver via a driving action, such as a steering action, a braking action, an acceleration action, any driving input/action, or any combination thereof.

Figure 3A:
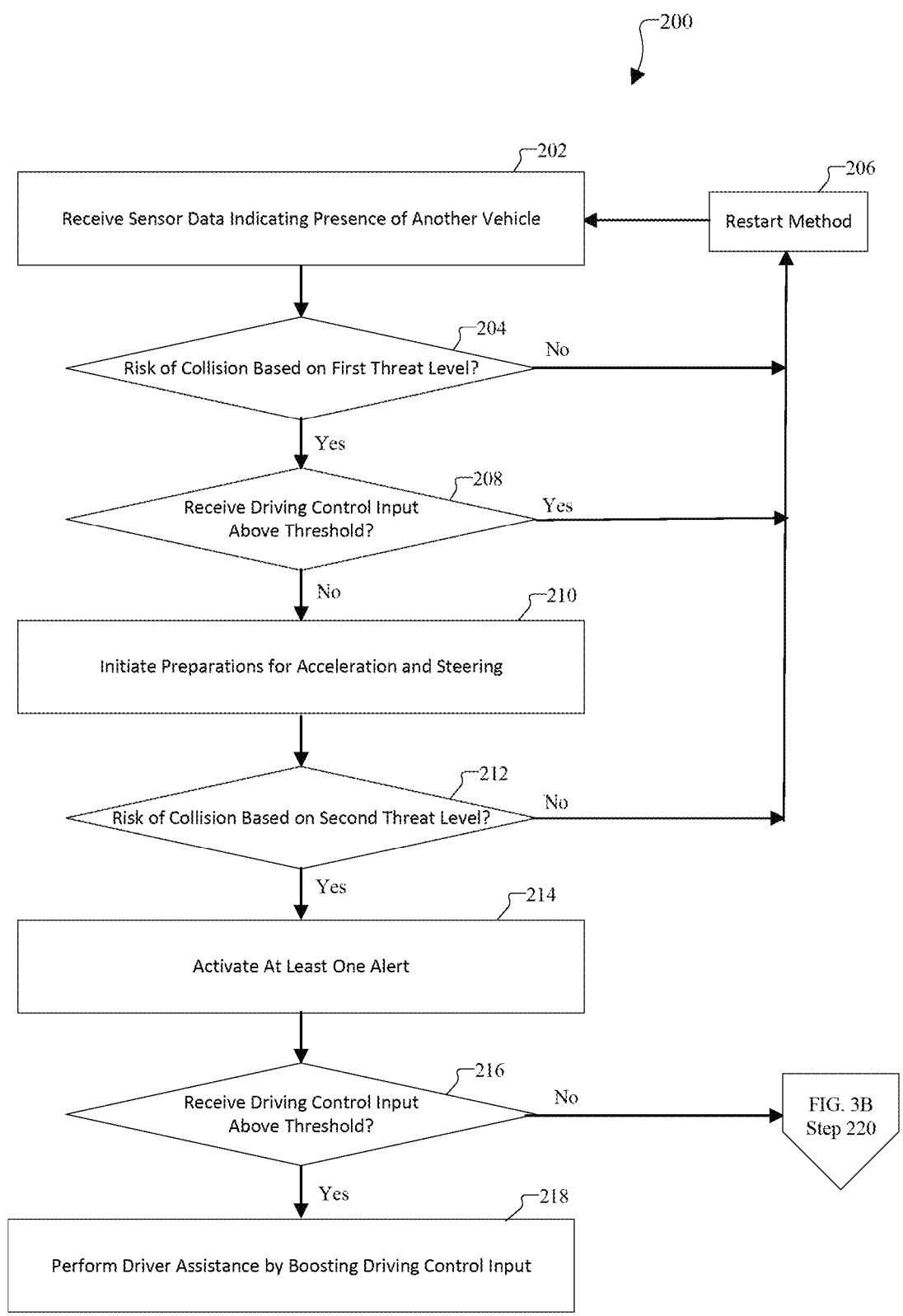
FIG. 3 is flow chart that illustrates a method that is implemented by the system of FIGS. 1-2 according to an example embodiment of this disclosure.
Figure 3B:
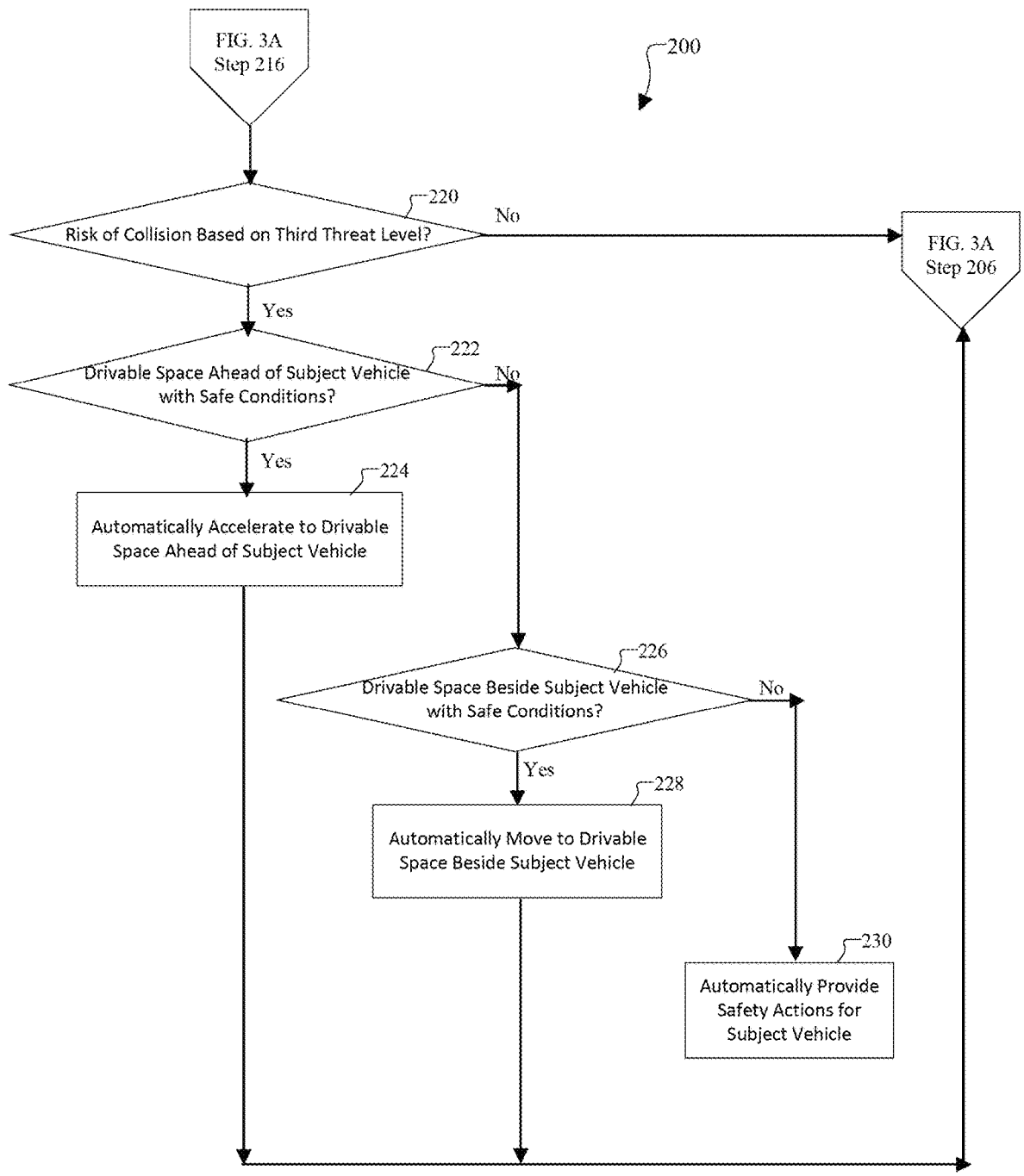

FIG. 3 is flow chart that illustrates a method 200 that is implemented by the system 100 for collision avoidance according to an example embodiment. In this regard, the method 200 is executable by any suitable hardware technology, software technology, or any combination of hardware and software technology. For instance, in an example embodiment, the method 200 is implemented by the control system 110, particularly the collision avoidance logic 120. In an example embodiment, the control system 110 is configured to detect threats and monitor corresponding threat levels while performing various collision avoidance actions based on assessments of criticality.

At step 202, in an example embodiment, the control system 110 receives sensor data from the sensor system 170. In this regard, upon detection, the sensor system 170 is configured to provide sensor data to the control system 110. For example, the sensor system 170 is configured to provide sensor data relating to a speed of the vehicle 10, an acceleration/deceleration of the vehicle 10, a location of the vehicle 10, other relevant data, or any combination thereof. In addition, the sensor system 170 is configured to provide sensor data relating to an environment surrounding the vehicle 10, the presence of another entity (e.g., vehicle, pedestrian, obstacle, etc.), any relevant data, or any combination thereof. More specifically, in an example embodiment, for instance, upon detection, the sensor system 170 is configured to provide sensor data that indicates a presence of another vehicle 300, which is behind the vehicle 10 with respect to a direction of travel of the vehicle 10. In an example embodiment, upon detection, the sensor system 170 is configured to provide sensor data relating to the speed of the vehicle 300, the acceleration/deceleration of the vehicle 300, the distance between the vehicle 10 and the vehicle 300, any relevant data, or any combination thereof. Upon receiving sensor data from the sensor system 170, the control system 110 is configured to perform step 204.

At step 204, in an example embodiment, the control system 110 determines if there is a risk of a potential collision between the vehicle 10 and another vehicle 300. The control system 110 is configured to make this determination based at least on the sensor data from the sensor system 170 of the vehicle 10. Additionally or alternatively, the control system 110 is configured to also utilize other relevant data from at least one other source, such as a mapping system, a sensor system associated with vehicle 300, a remote/mobile computing system, a cloud-based system, a communication system, any suitable technology, or any combination thereof. In an example embodiment, the control system 110 is configured to provide this determination by evaluating the sensor data with respect to first threshold criteria. For instance, in an example embodiment, the control system 110 is configured to compare the velocity of the rear vehicle 300 to the velocity of the vehicle 10 in relation to first threshold criteria. In this regard, upon determining that the velocity of the rear vehicle 300 is greater than the vehicle 10 by a certain extent as set forth by the first threshold criteria, then this determination can set or contribute to the setting of the threat level to the first level by the control system 110. Also, the control system 110 is configured to compare the current distance between the vehicle 10 and the rear vehicle 300 with first threshold criteria to determine if the vehicle 300 has sufficient space to brake or steer relatively comfortably and still avoid a collision with the vehicle 10. In this regard, upon determining that the current distance is less than a predetermined distance as set forth by the first threshold criteria such that the vehicle 300 does not have sufficient space to brake or steer in a relatively comfortable manner, then this determination can set or contribute to the setting of the threat level to the first level by the control system 110. In an example embodiment, upon determining that the threat level has not reached the first level, the control system 110 restarts the method 200, as indicated at step 206. Alternatively, if the control system 110 determines that the threat level has reached the first level, then the control system 110 sets the threat level to be at the first level and performs step 208.

At step 206, in an example embodiment, the control system 110 restarts the method 200 by proceeding to step 202. In this regard, the control system 110 is operable to continuously detect, monitor, track, and determine a risk or threat level of a potential collision between the vehicle 10 and another entity (e.g., vehicle 300). This feature is advantageous in enabling the vehicle 10 to be constantly aware of possible threats and/or threat levels, thereby enabling the vehicle 10 to avoid or mitigate a potential collision.

At step 208, in an example embodiment, the control system 110 determines if the driver is taking sufficient action to control the vehicle 10. In this regard, for instance, when the driver is controlling the vehicle 10, the ECU 100 receives driver controls via driving control system 190 (e.g., a gas pedal, a brake, a steering wheel, etc.) responsive to the driver's actions. Upon receiving driving controls above a predetermined threshold from the driving control system 190, the control system 110 performs the driving controls and proceeds to step 206. Alternatively, if the control system 110 does not receive driver controls or does not receive driver controls above the predetermined threshold during this time, then the control system 110 proceeds to step 210 since sufficient driver intervention has not been communicated to the control system 110 via the driving control system 190. In this regard, by evaluating the driver controls to at least predetermined threshold criteria after the first threat level has been set, the control system 110 is configured to check for a confirmed driving action (e.g., gas pedal is engaged by a certain amount) to conclude that the driver is aware and responding to the threat than just merely and slightly pressing the gas pedal in a nonchalant manner.

At step 210, in an example embodiment, the control system 110 is configured to initiate preparations for instantaneous acceleration and instantaneous steering. For instance, in an example embodiment, the control system 110 is configured to request the engine ECU 140 and the steering ECU 150 to optimize conditions and/or prepare for an acceleration action, a steering action, or a combination thereof. For instance, in an example embodiment, the control system 110 is configured to generate acceleration data to prepare the vehicle 10 for an acceleration action. Additionally or alternatively, the engine ECU 140 is configured to optimize parameters (e.g., engine rpm) to prepare for an acceleration action. Also, in an example embodiment, the control system 110 is configured to generate steering data to prepare the vehicle 10 for a steering action. In this regard, for example, the control system 110 is configured to set up the relevant components of the vehicle 10 so that these driving actions occur instantaneously upon determining that these driving actions should be performed to avoid a potential collision. In an example embodiment, for instance, the acceleration data and the steering data includes parameter data for an engine, parameter data for a transmission system, parameter for a steering system, and parameter data for an electronic stability program such that an instantaneous execution of the steering action and an instantaneous execution of the acceleration action occurs in response to driving controls from the driving control system 190.

At step 212, in an example embodiment, the control system 110 determines if the current risk of a potential collision is greater than the risk determined at step 204. The control system 110 is configured to make this determination based at least on an update of the sensor data from the sensor system 170 of the vehicle 10. In an example embodiment, the control system 110 is configured to provide this determination by evaluating current sensor data with respect to second threshold criteria. For instance, in an example embodiment, the control system 110 is configured to determine whether or not the rear vehicle 300 is decelerating, as well as whether or not the deceleration amount is sufficient to avoid the potential collision as set forth by second threshold criteria. Also, the control system 110 is configured to determine whether or not the vehicle 10 is accelerating, as well as whether or not the acceleration amount is sufficient to avoid the potential collision as set forth by second threshold criteria. In an example embodiment, upon determining that the threat level has escalated to the second level, the control system 110 performs step 214. Alternatively, upon determining that the threat level has not reached the second level, the control system 110 proceeds to step 202 to restart the method, as indicated at step 206.

At step 214, in an example embodiment, the control system 110 is configured to trigger an alert or a notification via the indicator system 180. In an example embodiment, the indicator system 180 is configured to provide any suitable and effective alert, notification, or communication, which may be visual, audio, haptic, sensory, or any combination thereof. For example, the control system 110 is configured to request the indicator system to activate one or more indicators 30. In an example embodiment, the indicator system 180 includes one or more indicators 30, which provides notification via a human machine interface (HMI) display, a sound system (e.g. speakers, etc.), at least one light (e.g., tail lamp, signaling light, in-vehicle light, etc.), a horn, any suitable output device that is in communication with the control system 110 and/or the indicator system 180, or any combination thereof. As a non-limiting example, for instance, the control system 110 is configured to trigger an alert to the rear vehicle 300 by activating the tail lamps and the horn of the vehicle 10 while also triggering an alert to a dashboard and/or display device of the vehicle 10. After one or more alerts/notifications are triggered, the control system 110 is configured to perform step 216.

At step 216, in an example embodiment, the control system 110 determines if the driver is taking sufficient action to control the vehicle 10. In this regard, for instance, if the driver is taking sufficient control of the vehicle 10, then the control system 110 receives driving controls via driving control system 190 (e.g., a gas pedal, a brake, a steering wheel, etc.) responsive to the driver's actions. Upon receiving driving controls above a predetermined threshold from the driving control system 190, the control system 110 proceeds to step 218. Alternatively, if the control system 110 does not receive driver controls or does not receive driver controls above the predetermined threshold during this time, then the control system 110 proceeds to step 220 since sufficient driver intervention has not been communicated to the control system 110 via the driving control system 190. In this regard, by evaluating the driver controls to predetermined threshold criteria after the second threat level has been set, the control system 110 is configured to check for a confirmed driving action (e.g., gas pedal is engaged by a certain amount) to conclude that the driver is aware and responding to the threat than just merely and slightly pressing the gas pedal in a nonchalant manner.

At step 218, in an example embodiment, the control system 110 triggers or activates a boost to the driver controls to control the vehicle 10. For example, the control system 110 is configured to provide active acceleration assistance via acceleration support and/or an acceleration boost to accelerate the vehicle 10 in a safe and suitable manner upon determining, for instance, that the gas pedal was pressed. In an example embodiment, the control system 110 configured to command an electronic boost controller to produce the requisite boost via a turbocharger in a case of a turbocharged engine. As another example, the control system 110 is configured to provide active steering assistance via steering support and/or a steering boost to steer the vehicle 10 in a safe and suitable manner upon determining, for instance, that the steering wheel was turned.

At step 220, in an example embodiment, the control system 110 determines if there is an even greater risk or likelihood of the potential collision between the vehicle 10 and the vehicle 300 than that determined at step 212. In this regard, for example, the control system 110 determines if the threat level has escalated from the second level to the third level. This risk assessment is based on a current evaluation, of current sensor data with respect to third threshold criteria. For instance, in an example embodiment, the control system 110 is configured to determine whether or not the threat level is at the third level based on whether or not the vehicle 10 is accelerating, as well as whether or not the acceleration amount is sufficient to avoid the potential collision as set forth by third threshold criteria. Also, the control system 110 is configured to determine whether or not the vehicle 10 is decelerating, as well as whether or not the deceleration amount is sufficient to avoid the potential collision as set forth by third threshold criteria. Additionally or alternatively, the control system 110 determines whether or not the threat level has reached the third level based on whether or not the distance between the vehicle 10 and the rear vehicle 300 is less than or equal to a predetermined distance 308 (or a range of predetermined distances) as set forth by third threshold criteria. If the control system 110 determines that the risk of collision is not greater than that determined at step 214, then the control system 110 proceeds to restart the method 200, as shown in step 206. On the other hand, if the control system 110 determines that the risk of collision between the vehicle 300 and the vehicle 10 has escalated from the second level to the third level, then the control system 110 performs step 222.

At step 222, in an example embodiment, the control system 110 determines if there is drivable space with safe conditions ahead of the vehicle 10 with respect to the direction of travel of the vehicle 10. The control system 110 is configured to make this determination based on sensor data from the sensor system 170. If the control system 110 determines that there is drivable space ahead of the vehicle 10 and the conditions are safe for the vehicle 10 to move into that drivable space, then the control system 110 is configured to perform step 224. Alternatively, upon determining that there is no drivable space ahead of the vehicle 10, there is insufficient drivable space ahead of the vehicle 10, and/or the conditions are not safe for the vehicle 10 to move into that drivable space, the control system 110 is configured to perform step 226. These determinations are advantageous in ensuring that the vehicle 10 is configured to avoid a collision with the vehicle 300 in a safe manner. For example, even though there may be drivable space ahead of the vehicle, the control system 110 is configured to determine if moving into that space is a safe option for the vehicle 10. For instance, as a non-limiting example, the control system 110 is configured to prevent the vehicle 10 from moving into drivable space ahead of the vehicle 10 upon determining (e.g., via vehicle-to-infrastructure communication) that the traffic light is red or turning red, thereby being an unsafe option for the vehicle 10.

At step 224, in an example embodiment, the control system 110 is configured to automatically accelerate the vehicle 10 into the drivable space, as determined at step 222. In this regard, the control system 110 controls the vehicle 10 in an autonomous driving mode and performs the acceleration action such that the vehicle 10 safely moves into the drivable space ahead of the vehicle 10 with respect to a direction of travel of the vehicle 10. The control system 110 is thus configured to provide the vehicle 10 with a safe, immediate, and timely maneuver to avoid the potential collision. This autonomous driving control feature is beneficial in a number of cases, such as when a driver panics, freezes, and/or is unable to make such determinations quickly enough to avoid a collision.

At step 226, in an example embodiment, the control system 110 is configured to determine if there is drivable space with safe conditions on at least one lateral side of the vehicle 10 with respect to the direction of travel of the vehicle 10. In an example embodiment, the control system 110 is configured to make this determination based on the sensor data. For example, the control, system 110 is configured to evaluate a left side of the vehicle 10, a right side of the vehicle 10, or both the left and right sides of the vehicle 10 for drivable space. In addition, the control system 110 is configured to determine if the conditions are safe for the vehicle 10 to move into that drivable space. In an example embodiment, for instance, the control system 110 is configured to sequentially evaluate a first lateral side and then evaluate a second lateral side upon determining that the first lateral side does not provide a sufficient amount of drivable space and/or safe conditions for the vehicle 10 to move into that drivable space. Alternatively, in an example embodiment, the control system 110 is configured to simultaneously evaluate the first lateral side and the second lateral side, and then select the safest and/or most convenient lateral side for a lane change process provided that one of these lateral sides is deemed to provide sufficient drivable space and/or safe conditions for a lane change. In an example embodiment, the control system 110 is configured to compare a detected lateral space with a predetermined amount that is suitable for the vehicle 10 to change lanes. Also, in an example embodiment, the control system 110 is configured to provide a safety check for each drivable space to determine if moving into that drivable space is a safe option for the vehicle 10. The control system 110 is thus configured to provide the vehicle 10 with a safe, immediate, and timely maneuver to avoid the potential collision. This autonomous driving control feature is beneficial in cases in which a driver panics, freezes, and/or is unable to make such determinations quickly enough to avoid a collision.

At step 228, in an example embodiment, the control system 110 is configured to automatically accelerate the vehicle 10 into the drivable space, as determined at step 226. In this regard, the control system 110 controls the vehicle 10 in an autonomous driving mode and performs the lane change process (e.g., steering action, etc.) so that the vehicle 10 safely moves into the drivable space at a lateral side of the vehicle. This feature advantageously provides the vehicle 10 with a safe, immediate, and timely maneuver to avoid the potential collision in a favorable manner.

At step 230, in an example embodiment, the control system 110 is configured to provide safety mechanisms, actions, precautions, or any combination thereof in preparation of a collision. In this regard, for instance, the control system 110 is configured to trigger or activate at least one seat belt tensioner for at least one occupant of the vehicle 10. Additionally or alternatively, the control system 110 is configured to trigger or activate a communication to a response team (e.g., emergency response team, tow company, emergency contact person, etc.) in the event that the vehicle 10 is involved in a collision.

Figure 4:
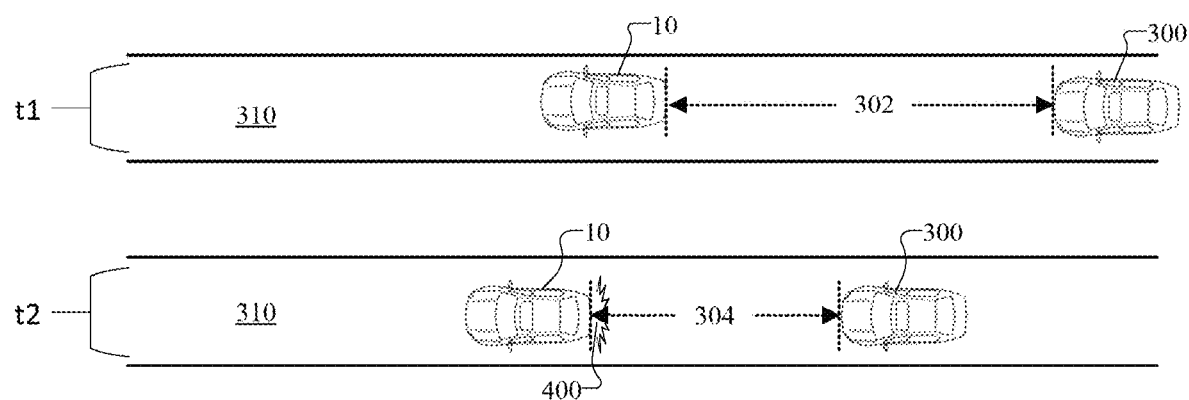
FIG. 4 is a diagram of a non-limiting instance in which the threat level is set at a first level according to an example embodiment of this disclosure.

FIG. 4 illustrates a non-limiting scenario in which the system 100 transitions the threat level from a default state (e.g., a non-threat state) to a first level according to an example embodiment of this disclosure. More specifically, FIG. 4 illustrates a first time instance t1 and a second time instance t2. In the first time instance t1, which serves as a reference example, the vehicle 10 and the vehicle 300 are traveling within the same driving lane 310 of a roadway. In this first instance, the vehicle 10 is traveling at a first speed, e.g. 20 kilometers per hour ("kph"), and the rear vehicle 300 is traveling at another speed, e.g. 70 kph. Although the vehicle 10 and the rear vehicle 300 are driving in the same lane 310 and at different speeds with the rear vehicle 300 quickly approaching the vehicle 10, the system 100 maintains its default state (e.g., normal state, non-threat state, etc.). In this default state, the system 100 is not set to any of the threat levels because there is a non-threatening distance 302 (e.g., predetermined number of kilometers) between the vehicle 10 and the rear vehicle 300 based at least on the speed (and/or acceleration/deceleration) of the vehicle 10 and the speed (and/or acceleration/deceleration) of the rear vehicle 300. In this default state, as determined by the system 100, there is no risk or a low risk of a rear collision between the vehicle 10 and any rear vehicle 300.

In addition, FIG. 4 further illustrates a second time instance t2 in which the system 100 determines that the threat level is at a first level. More specifically, responsive to sensor data, the system 100 determines that the rear vehicle 300 now presents a threat/hazard 400 to the vehicle 10 based on an evaluation of the sensor data. In an example embodiment, the system 100 provides this evaluation based at least on information relating to the speed of the vehicle 10, acceleration/deceleration of the vehicle 10, speed of the rear vehicle 300, acceleration/deceleration of the rear vehicle 300, distance between the vehicle 10 and the rear vehicle 300, any relevant data, or any combination thereof. In FIG. 4, for example, at the second time instance t2, the vehicle 10 is moving at the first speed (e.g., 20 kph) and the rear vehicle 300 is moving at another speed (e.g., 60 kph). Although the rear vehicle 300 has reduced its speed, the system 100 sets the threat level at the first level for the vehicle 10 at least since the distance 304 between the vehicle 10 and the rear vehicle 300 presents a threat or hazard to the vehicle 10 based at least on the speed of the vehicle 10, the acceleration/deceleration of the vehicle 10, the speed of the rear vehicle 300, and the acceleration/deceleration of the rear vehicle 300. That is, in this case, the distance 304 is less than a safe and/or minimum distance (or a range of safe distances) in which the rear vehicle 300 is operable to brake or steer (or comfortably brake or steer) to avoid a collision. In this scenario, when the threat level is set at the first level, the system 100 is operable to prevent, reduce, or avoid a collision between the vehicle 10 and the rear vehicle 300. More specifically, in an example embodiment, as indicated in FIG. 3A, once the threat level is set at the first level, the system 100 is configured to enable the driver to control the vehicle 10 in accordance with driving controls if driving control input above a predetermined threshold is received while restarting the method (step 206) and initiate preparations for acceleration and steering if driving control input is not received or is not above the predetermined threshold (step 210).

Figure 5:
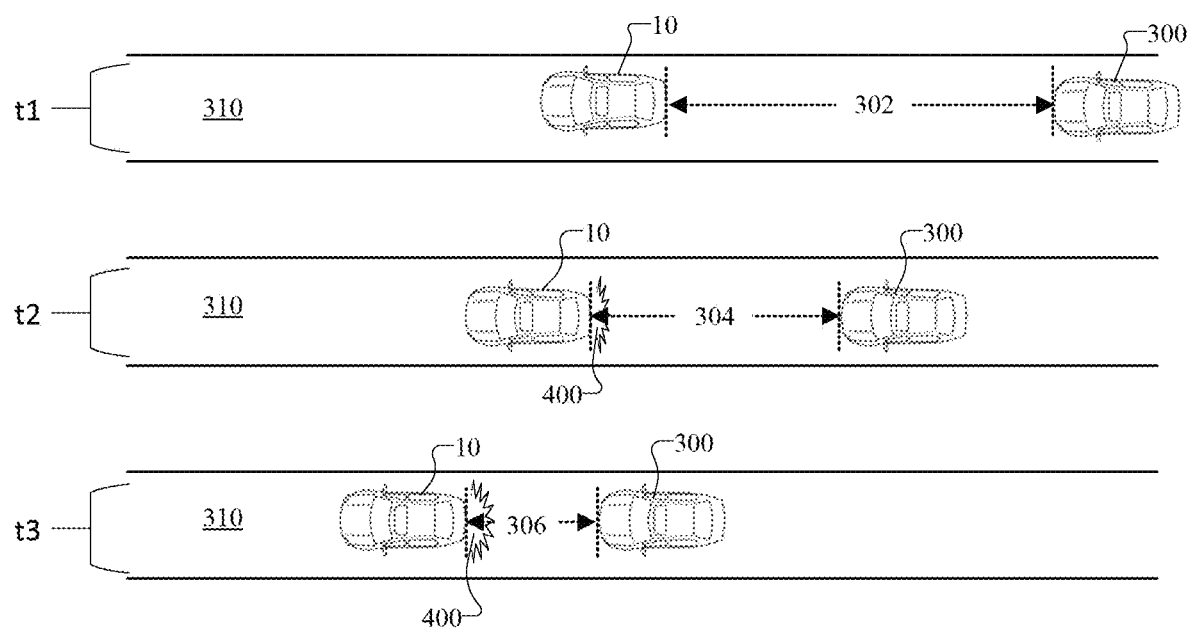
FIG. 5 is a diagram of a non-limiting instance in which the threat level is set at a second level according to an example embodiment of this disclosure.

FIG. 5 illustrates a continuation of the non-limiting scenario of FIG. 4. In this regard, the first time instance t1 and the second time instance t2 of FIG. 5 refer to the first time instance t1 and the second time instance t2 of FIG. 4. Since the first time instance t1 and the second time instance t2 were previously discussed with respect to FIG. 4, these time instances are not discussed below. In addition to the first time instance t1 and second time instance t2, FIG. 5 illustrates a third time instance t3 in which the system 100 determines that the threat level is at a second level.

In an example embodiment, responsive to sensor data, the system 100 determines that the rear vehicle 300 presents a greater potential threat/hazard 400 to the vehicle 10 based on an evaluation of the sensor data at the current time instance compared to the evaluation of the sensor data at the previous time instance. In an example embodiment, the system 100 provides this evaluation based at least on information relating to the speed of the vehicle 10, acceleration/deceleration of the vehicle 10, speed of the rear vehicle 300, acceleration/deceleration of the rear vehicle 300, distance between the vehicle 10 and the rear vehicle 300, any relevant data, or any combination thereof. In FIG. 5, for example, at the third time instance t3, the vehicle 10 is traveling at the first speed (e.g., 20 kph) and the rear vehicle 300 is traveling at another speed (e.g., 50 kph). Although the rear vehicle 300 has reduced its speed, the system 100 is set at the second level at least since the rear vehicle 300 is not at a sufficient speed and/or is not decelerating enough to avoid the potential collision and the vehicle 10 is not accelerating (or not accelerating enough) to avoid the potential collision. As an additional or alternative factor, in this third time instance t3, the system 100 sets the threat level at the second level for the vehicle 10 at least since the distance 306 between the vehicle 10 and the rear vehicle 300 presents a threat or hazard to the vehicle 10 based at least on the current speed of the vehicle 10 and the current speed of the rear vehicle 300. In this scenario, when the threat level is set at the second level, the system 100 is operable to prevent, reduce, or avoid a collision between the vehicle 10 and the rear vehicle 300. In this regard, for example, as indicated in FIG. 3A, once the threat level is set to the second level, the system 100 is configured to trigger one or more alerts (step 214). In an example embodiment, for instance, the alerts provide notification regarding a potential collision and/or any precautionary actions taken by the system 100.

Figure 6:
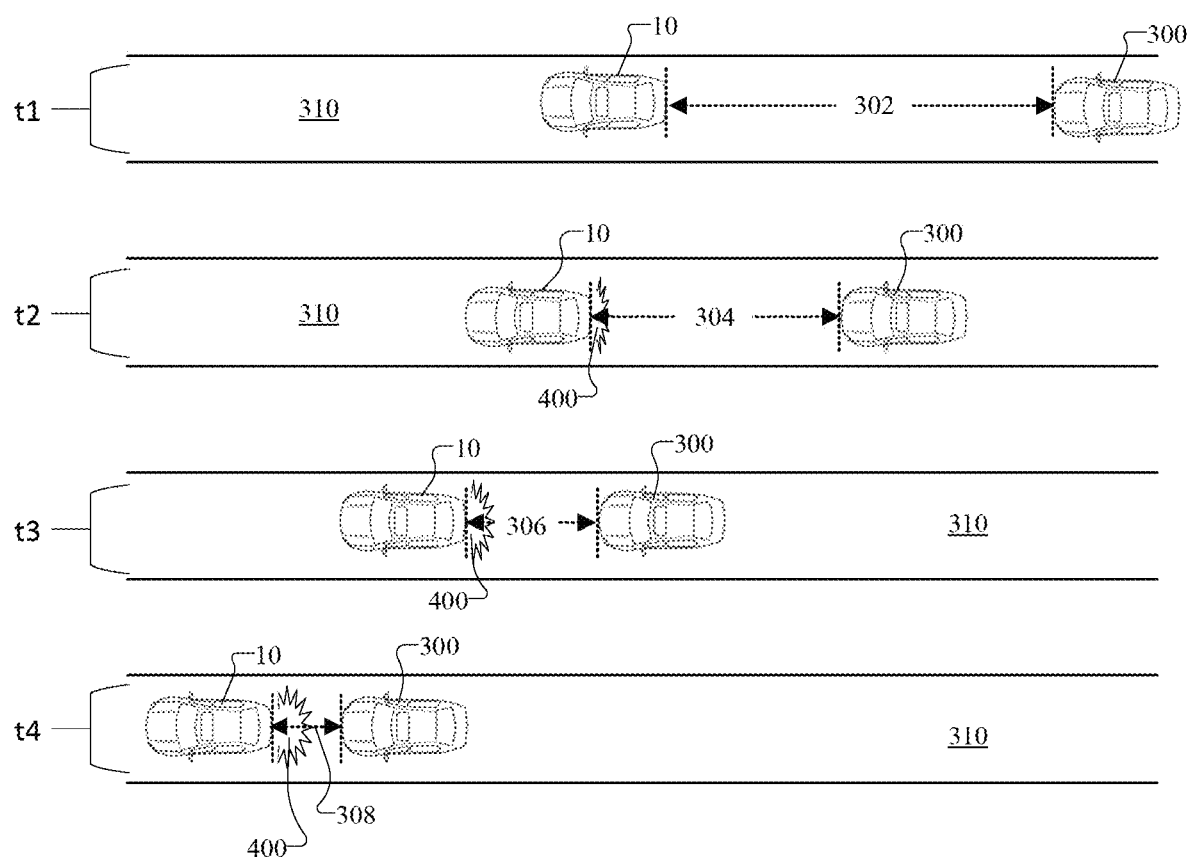
FIG. 6 is a diagram of a non-limiting instance in which the threat level is set at a third level according to an example embodiment of this disclosure.

FIG. 6 illustrates a continuation of the non-limiting scenario of FIG. 5. In this regard, the first time instance t1, the second time instance t2, and the third time instance t3 of FIG. 6 refer to the first time instance t1, the second time instance t2, and the third time instance t3 of FIG. 5. Since the first time instance t1, the second time instance t2, and the third time instance t3 were previously discussed with respect to FIG. 5, these time instances are not discussed below. In addition to the first time instance t1, the second time instance t2, and the third time instance t3, FIG. 6 illustrates a fourth time instance t4 in which the system 100 determines that the threat level is at a third level.

In an example embodiment, responsive to sensor data, the system 100 determines that the rear vehicle 300 presents a greater potential threat/hazard 400 to the vehicle 10 based on, an evaluation of the sensor data at the current time instance compared to the evaluation of the sensor data at the previous time instance. In an example embodiment, the system 100 provides this evaluation based at least on information relating to the speed of the vehicle 10, information relating to the speed of the rear vehicle 300, information relating to the distance between the vehicle 10 and the rear vehicle 300, any relevant data, or any combination thereof. In FIG. 6, for example, at the fourth time instance t4, the vehicle 10 is traveling at the first speed (e.g., 20 kph) and the rear vehicle 300 is traveling at another speed (e.g., 40 kph). Although the rear vehicle 300 has reduced its speed, the system 100 sets the threat level at the third level for the vehicle 10 at least since the distance 308 between the vehicle 10 and the rear vehicle 300 is at or less than a predefined distance associated with the third threshold criteria. Also, in this third time instance t3, the system 100 is set at the third level at least since the vehicle 10 is still not performing an acceleration action and/or a steering action to avoid the potential collision. In this scenario, when the threat level is set at the third level, the system 100 is operable to prevent or mitigate a potential collision between the vehicle 10 and the rear vehicle 300 by controlling the vehicle 10 in an autonomous driving control mode, as indicated in steps 224 and 228, or by providing safety precautions, as indicated at step 230.

As described above, the system 100 provides a number of advantageous features, as well as benefits. For example, the system 100 is configured to provide driving assistance to a driver of the vehicle 10 for rear collision avoidance. In addition, the system 100 is configured to act for or on behalf of the driver by providing autonomous driving control to the vehicle 10 for rear collision avoidance. The system 100 is configured to provide these features at a relatively low cost by using sensors (e.g., rear camera, radar sensors, etc.) that are already provided with most vehicles. Moreover, the system 100 is advantageously operable to selectively provide this driving assistance and this autonomous driving control by continuously monitoring for a potential threat at a side (e.g., rear side) of the vehicle 10. This continuous monitoring feature is advantageous in a number of scenarios, such as when a driver's attention is directed to a front side of the vehicle 10 and in the direction of travel such that the driver is unaware of a potential threat at a rear side of the vehicle 10.

In addition, the system 100 is configured to assess a threat level or risk level of a potential collision between the vehicle 10 and another entity (e.g., vehicle 300). In accordance with this assessment, the system 100 is configured to determine if driving assistance or autonomous driving control should be performed when driving controls are not received or when driving controls above the predetermined threshold are not received. In this regard, for example, the feature of selectively providing driving assistance in some cases and autonomous driving control in other cases is advantageous at least since the vehicle 10 is provided with an optimal response or action based on a number of factors, such as an assessment of the threat level, the receipt of driving controls, etc. Moreover, the system 100 is advantageously configured to provide this optimal response or action instantaneously or immediately upon making the appropriate determinations by initiating preparations for driving actions, such as steering, acceleration, etc., at the onset of detecting a threat of a potential collision. In this regard, for instance, upon determining to execute one or more driving actions, the system 100 is advantageously configured to execute these driving actions (e.g., acceleration action, steering action, etc.) for the vehicle 10 at a quicker speed compared to that of another vehicle 300 because the system 100 has already requested the engine ECU 140 and the steering ECU 150 to optimize conditions for an immediate and instantaneous response to avoid or mitigate the potential collision. The system 100 is configured to execute these driving actions immediately, irrespective if a driver or the system 100 provides these driving actions (e.g., acceleration action and/or the steering action). In this regard, the system 100 is advantageously configured to detect, monitor, and provide the vehicle 10 with strategic operations for collision avoidance. Moreover, this system 100 is not limited to the depicted embodiments, but is scalable and/or extendable to other embodiments such as level five autonomy vehicles, other suitable vehicles, etc.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A method for collision avoidance, the method comprising:

receiving, by a control unit with at least one processing device, sensor data from a plurality of sensors associated with a subject vehicle, the sensor data indicating at least (a) a speed of the subject vehicle, (b) a speed of another vehicle that is behind the subject vehicle in a direction of travel of the subject vehicle, and (c) a distance between the another vehicle and the subject vehicle;

evaluating, by the control unit, the sensor data to determine a risk level of a potential collision between the subject vehicle and the another vehicle;

generating, by the control unit, acceleration data to prepare the subject vehicle for an acceleration action based on the evaluation of the sensor data;

generating, by the control unit, steering data to prepare the subject vehicle for a steering action based on the evaluation of the sensor data;

performing, by the control unit, driving assistance if driving control input above a predetermined threshold is received after the control unit generates the acceleration data and the steering data; and controlling, by the control unit, the subject vehicle in autonomous driving mode based on the evaluation of the sensor data if the driving control input above the predetermined threshold is not received after the control unit generates the acceleration data and the steering data, wherein the autonomous driving mode is associated with a process that includes:
determining, by the control unit, that a front space at a front side of the subject vehicle is less than a first amount of drivable space that is sufficient for collision avoidance of the subject vehicle, the front side being ahead of the subject vehicle with respect to the direction of travel of the subject vehicle;
determining, by the control unit, that a lateral space at a lateral side of the subject vehicle includes or exceeds a second amount of drivable space that is sufficient for collision avoidance of the subject vehicle, the lateral side being disposed at a right side or left side of the subject vehicle with respect to the direction of travel of the subject vehicle;
determining, by the control unit, that the lateral space includes safe driving conditions; and
activating, by the control unit, an autonomous lane change process to move the subject vehicle into the lateral space after determining that the lateral space includes or exceeds the second amount of drivable space and after determining that the lateral space includes safe driving conditions.

2. The method of claim 1, further comprising:
receiving, by the control unit, the driving control input via a steering device of the subject vehicle, an acceleration device of the subject vehicle, or both the steering device and the acceleration device of the subject vehicle; and
providing, by the control unit, the driving assistance to the subject vehicle based on the driving control input and the sensor data such that the subject vehicle avoids the potential collision with the another vehicle.

3. The method of claim 2, wherein the driving assistance includes:
providing, by the control unit, an automatic boost in accelerating the subject vehicle upon receipt of the driving control input from the acceleration device; and
providing, by the control unit, an automatic boost in steering the subject vehicle upon receipt of the driving control input from the steering device.

4. The method of claim 1, wherein the steering data and the acceleration data includes parameter data for an engine, a transmission system, a steering system, and an electronic stability program such that an instantaneous execution of the steering action and an instantaneous execution of the acceleration action occurs in response to the driving control input.

5. The method of claim 1, wherein the process further comprises:
determining, by the control unit, that the front space at the front side of the subject vehicle includes or exceeds the first amount of drivable space that is sufficient for collision avoidance of the subject vehicle, the front side being ahead of the subject vehicle with respect to the direction of travel of the subject vehicle;
determining, by the control unit, that the front space includes safe driving conditions; and
accelerating, by the control unit, the subject vehicle into the front space upon determining that the front space includes or exceeds the first amount of drivable space and upon determining that the front space includes safe driving conditions.

6. The method of claim 1, further comprising:
activating, by the control unit, an alert regarding the potential collision between the subject vehicle and the another vehicle;
wherein:
the alert includes an audio notification, a visual notification, or both audio and visual notifications; and
the alert is activated before providing the driving assistance or before the autonomous driving mode.

7. A method for collision avoidance, the method comprising:
receiving, by a control unit with at least one processing device, sensor data from a sensor system with one or more sensors associated with a subject vehicle;
setting, by the control unit, a threat level of the subject vehicle to be at a first level based on a first evaluation of the sensor data with respect to first threshold criteria;
generating, by the control unit, acceleration data to prepare for an acceleration action of the subject vehicle after the threat level is set at the first level;
generating, by the control unit, steering data to prepare for a steering action of the subject vehicle after the threat level is set at the first level; and
setting, by the control unit, the threat level of the subject vehicle to be at a second level based on a second evaluation of an update of the sensor data with respect to second threshold criteria, the second level indicating a greater likelihood of a potential collision between the subject vehicle and another vehicle compared to the first level, the second threshold criteria including a sufficient acceleration amount for the subject vehicle to avoid the potential collision and a sufficient deceleration amount for the another vehicle to avoid the potential collision;
wherein,
the control unit is configured to selectively provide the subject vehicle with driving assistance or autonomous driving control after the threat level is set at the second level, and
the autonomous driving control is associated with a process that includes:
determining, by the control unit, that a front space at a front side of the subject vehicle is less than a first amount of drivable space that is sufficient for collision avoidance of the subject vehicle, the front side being ahead of the subject vehicle with respect to a direction of travel of the subject vehicle;
determining, by the control unit, that a lateral space at a lateral side of the subject vehicle includes or exceeds a second amount of drivable space that is sufficient for collision avoidance of the subject vehicle, the lateral side being disposed at a right side or left side of the subject vehicle with respect to the direction of travel of the subject vehicle;

determining, by the control unit, that the lateral space includes safe driving conditions; and activating, by the control unit, an autonomous lane change process to move the subject vehicle into the lateral space after determining that the lateral space includes or exceeds the second amount of drivable space and after determining that the lateral space includes safe driving conditions.

8. The method of claim 7, further comprising:

providing, by the control unit, the driving assistance if driving control Input above a predetermined threshold is received when the threat level is set at the second level; and providing, by the control unit, the autonomous driving control if the driving control input above the predetermined threshold is not received before transitioning the threat level from the second level to a third level based on a third evaluation of another update of the sensor data with respect to third threshold criteria, the third level indicating a greater likelihood of the potential collision between the subject vehicle and the another vehicle compared to the second level, the third threshold criteria including a predetermined distance between the subject vehicle and the another vehicle.

9. The method of claim 8, further comprising:

receiving, by the control unit, the driving control input via a steering device of the subject vehicle, an acceleration device of the subject vehicle, or both the steering device and the acceleration device of the subject vehicle; and providing, by the control unit, the driving assistance to the subject vehicle based on the driving control input and the sensor data such that the subject vehicle avoids the potential collision with the another vehicle.

10. The method of claim 9, wherein the driving assistance includes:

providing, by the control unit, an automatic boost in accelerating the subject vehicle upon receipt of the driving control input that includes the acceleration action from the acceleration device; and providing, by the control unit, an automatic boost in steering the subject vehicle upon receipt of the driving control input that includes the steering action from the steering device.

11. The method of claim 8, further comprising:

activating, by the control unit, an alert for the subject vehicle and the another vehicle;

wherein:
the alert includes an audio notification, a visual notification, or both audio and visual notifications;
the alert is activated after setting the threat level to the second level; and
the alert is activated before providing the driving assistance or before providing the autonomous driving control.

12. The method of claim 7, wherein the steering data and the acceleration data includes parameter data for an engine, a transmission system, a steering system, and an electronic stability program such that an instantaneous execution of the steering action and an instantaneous execution of the acceleration action occurs in response to driving control input.

13. The method of claim 7, wherein the process further comprises:

determining, by the control unit, that the front space at the front side of the subject vehicle includes or exceeds the first amount of drivable space that is sufficient for collision avoidance of the subject vehicle, the front side being ahead of the subject vehicle with respect to a direction of travel of the subject vehicle;

determining, by the control unit, that the front space includes safe driving conditions; and accelerating, by the control unit, the subject vehicle into the front space after determining that the front space includes or exceeds the first amount of drivable space and after determining that the front space includes safe driving conditions.

14. A system for collision avoidance, said system comprising:

a sensor system including one or more sensors associated with a subject vehicle;

a control unit including at least one processing device, the control unit being in communication with the sensor system and being configured to receive sensor data from the sensor system;

generate acceleration data to prepare for an acceleration action of the subject vehicle;

generate steering data to prepare for a steering action of the subject vehicle;

provide driving assistance to the subject vehicle if a driving control input above a predetermined threshold is received after the control unit generates the acceleration data and the steering data; and control the subject vehicle in an autonomous driving mode if the driving control input above the predetermined threshold is not received after the control unit generates the acceleration data and the steering data, wherein the control unit is configured to perform a process associated with the autonomous driving mode that includes:

determining that a front space at a front side of the subject vehicle is less than a first amount of drivable space that is sufficient for collision avoidance of the subject vehicle, the front side being ahead of the subject vehicle with respect to a direction of travel of the subject vehicle;

determining that a first lateral space at a first lateral side of the subject vehicle is less than a first lateral amount of drivable space that is sufficient for collision avoidance of the subject vehicle, the first lateral side being at a lateral side of the subject vehicle with respect to the direction of travel of the subject vehicle;

determining that a second lateral space at a second lateral side of the subject vehicle includes or exceeds a second lateral amount of drivable space that is sufficient for collision avoidance of the subject vehicle, the second lateral side being opposite to the first lateral side of the subject vehicle;

determining that the second lateral space includes safe driving conditions; and activating an autonomous lane change process to move the subject vehicle into the second lateral space after determining that the second lateral space includes or exceeds the second amount of drivable space and after determining that the second lateral space includes safe driving conditions.

15. The system of claim 14, wherein:

the control unit is configured to receive the driving control input via a steering device of the subject vehicle, an acceleration device of the subject vehicle, or both the steering device and the acceleration device of the subject vehicle, and the control unit is configured to provide the driving assistance to the subject vehicle based on the driving control input and the sensor data such that the subject vehicle avoids a potential collision with another vehicle.

16. The system of claim 14, wherein:

the driving assistance includes providing an automatic boost in accelerating the subject vehicle upon receipt of the driving control input that includes the acceleration action from the acceleration device; and the driving assistance includes providing an automatic boost in steering the subject vehicle upon receipt of the driving control input that includes the steering action from the steering device.

17. The system of claim 14, wherein the steering data and the acceleration data includes parameter data for an engine, a transmission system, a steering system, and an electronic stability program such that an instantaneous execution of the steering action and an instantaneous execution of the acceleration action occurs in response to the driving control input.

* * * * *